(12) United States Patent
Pelton

(10) Patent No.: US 11,503,085 B2
(45) Date of Patent: Nov. 15, 2022

(54) MULTIMEDIA COMPOSITION IN MEETING SPACES

(71) Applicant: Polycom, Inc., San Jose, CA (US)

(72) Inventor: Greg Pelton, Raleigh, NC (US)

(73) Assignee: POLYCOM, INC., San Jose, CA (US)

( * ) Notice: Subject to any disclaimer, the term of this patent is extended or adjusted under 35 U.S.C. 154(b) by 43 days.

(21) Appl. No.: 16/017,771

(22) Filed: Jun. 25, 2018

(65) Prior Publication Data

US 2019/0007463 A1   Jan. 3, 2019

Related U.S. Application Data

(60) Provisional application No. 62/527,969, filed on Jun. 30, 2017.

(51) Int. Cl.
*H04L 65/1069* (2022.01)
*H04L 65/403* (2022.01)
*H04L 41/12* (2022.01)
*H04L 65/80* (2022.01)
*H04L 41/0806* (2022.01)
*H04L 41/084* (2022.01)

(52) U.S. Cl.
CPC ...... *H04L 65/1069* (2013.01); *H04L 41/0806* (2013.01); *H04L 41/12* (2013.01); *H04L 65/4046* (2013.01); *H04L 65/80* (2013.01); *H04L 41/0843* (2013.01)

(58) Field of Classification Search
CPC . H04L 41/12; H04L 65/1069; H04L 65/4046; H04L 41/0806
See application file for complete search history.

(56) References Cited

U.S. PATENT DOCUMENTS

| 8,774,056 B2 * | 7/2014 | Lueckenhoff | H04L 67/16 370/255 |
| 10,181,978 B1 * | 1/2019 | Argenti | H04L 67/12 |
| 2011/0119597 A1 * | 5/2011 | Yellamraju | G06F 3/01 715/753 |
| 2012/0069131 A1 * | 3/2012 | Abelow | G06Q 10/067 348/14.01 |
| 2017/0188088 A1 * | 6/2017 | Hammer | H04N 21/8146 |

* cited by examiner

*Primary Examiner* — William G Trost, IV
*Assistant Examiner* — Christopher P Cadorna
(74) *Attorney, Agent, or Firm* — Lindauer Law, PLLC

(57) ABSTRACT

Functions and controls for multimedia sessions are shared amongst pluralities of electronic components, rather than run by a single control unit. A disaggregate multipoint control includes a plurality of electronic components which are, or can be, coupled over a network. The various components are configured to recognize the others and share functions and controls normally associated with a single endpoint device, in order to facilitate a multimedia session.

18 Claims, 4 Drawing Sheets

MULTIMEDIA COMPOSITION IN MEETING SPACES

CROSS-REFERENCE TO RELATED APPLICATION

This application claims priority to U.S. Provisional Application No. 62/527,969 filed on Jun. 30, 2017, the contents of which are entirely incorporated herein.

TECHNICAL FIELD

The present disclosure relates generally to multimedia communications. More specifically, to a technique and system for multimedia communications with disaggregate control, comprising a plurality of electronic components, the plurality of electronic components communicatively coupled together over a network, and configured to enable the network to facilitate a multimedia session when coupled, wherein functions and controls of the multimedia session are shared amongst the plurality of electronic components.

BACKGROUND

Video, audio and content collaboration has historically involved integrated hardware or software clients running at the user site. Hardware clients might be manifested as videoconferencing endpoints which comprise a video encoder/decoder (codec), a camera, one or more video displays, speakers and microphones. Telepresence systems may also use multiple (e.g., two, three or five) monitors and a corresponding number of cameras and codecs to implement a highly customized experience presenting a group of users in near life size to the other end of the call. Software clients might run on a personal computer (PC) with built in camera, display, microphone and speakers, or they can incorporate external web cameras and speakers and monitors. In other cases, software clients might run on a notebook computer, smartphone, tablet, or other portable device. When multiple sites and parties are involved in a call, the audio, video and content streams from each site are coordinated in the network by a Multipoint Control Unit (MCU). Generally, multipoint refers to events having multiple participants utilizing bridging functionality between the participants. The MCU may be an additional "endpoint" on the call, such as a centralized server, or MCU functionality may be built into one of the other endpoints. In the case of Advanced Video Coding (AVC) calls (and calls using older encoding techniques), the video streams are laid out in a number of pre-determined formats and sent to each endpoint as a single, composed stream. In the case of Scalable Video Coding (SVC) calls, a subset of the streams may be selected and relayed by the MCU back to each endpoint. The endpoints then compose the individual streams into a number of predetermined layouts on the local displays. However, in each case a specific MCU, configured in a specific manner, is required.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings.

DETAILED DESCRIPTION

Figure 1A:
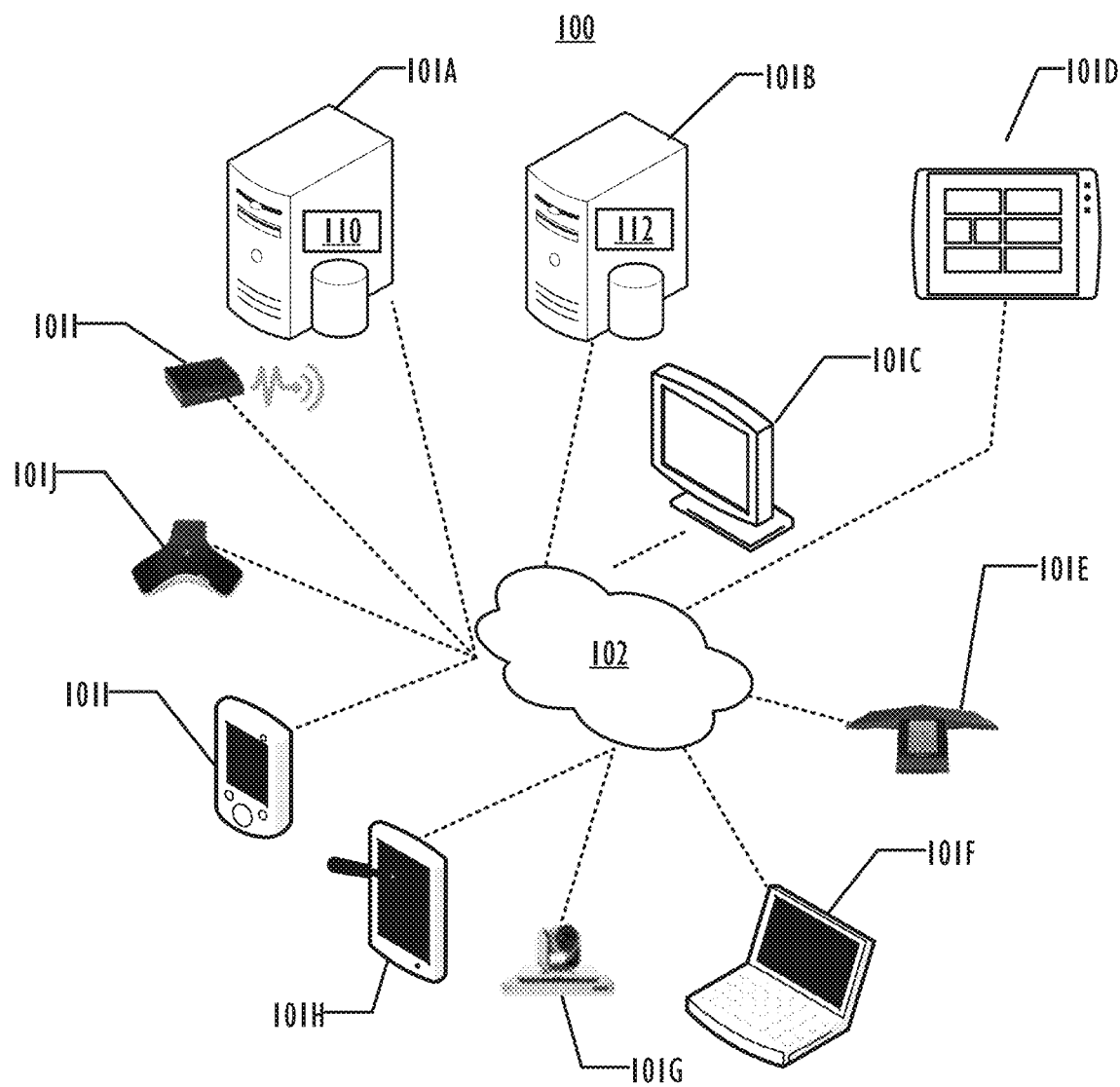
FIG. 1A illustrates a modular room system, in accordance with an embodiment of this disclosure.

Reference to the drawings illustrating various views of exemplary embodiments is now made. In the drawings and the description of the drawings herein, certain terminology is used for convenience only and is not to be taken as limiting the embodiments of the present disclosure. Furthermore, in the drawings and the description below, like numerals indicate like elements throughout.

Embodiments of this disclosure pertain to disaggregate endpoints using a concept called the Modular Room (MR). A MR may be a logical endpoint organized from a networked set of services and devices. An endpoint generally refers one or more devices organized to produce or consume session content, such as a videoconferencing system or a digital whiteboard system. As an example, such as system may comprise a set of devices, physically wired together into a certain topology to implement a certain functionality, such as teleconferencing. A MR may comprise a networked set of devices, such as a camera, microphone, and a mobile device, capable of dynamically organizing themselves to implement collaboration functionality.

By disaggregating devices into modular solutions, greater flexibility and customizability may be enabled. For example, disaggregation of devices into a modular solution enables much greater flexibility in how different capabilities are located in physical spaces and how the user experience can be customized. For example, by logically tying together a set of services and devices, the device and services provided may be reconfigured and managed in real time based on the devices and services available. Additionally, a richer experience may be enabled by multiple streams of multimedia coming into and going out of the room. Disaggregation may allow for many more multimedia streams into and out of a particular room. For example, a conference room may include multiple fixed microphones, sensors, a central display device and central camera, as well as multiple user devices, such as laptops, each equipped with separate microphones and cameras. These multiple individual multimedia streams may be coordinated into, for example, a single composed stream or set of selected streams for display. A disaggregate multipoint control unit may be provided for this coordination. This coordination may be across a number of devices with distinct functionality that may be connected together over a local network rather than being directly physically connected or integrated. Multipoint control, as applied to the MR, may refer to control of multiple devices within a single room with a single participant, as well as controlling these multiple devices in coordination with bridging functionality between multiple participants, such as that provided by a MCU. A composing mechanism may be provided for a site, such as a room, to provide coordinating functionality. In addition, the composing mechanism may help combine various media streams into a composite format to help order the output of the multiple devices into a coherent way. This composing mechanism may reside in a single device, or elements of the composing mechanism may be placed integrated into another device. An orchestration mechanism may also be provided for a MR to help provide rules for managing one or more streams. The orchestration may also help coordinate order and sequencing for the one or more streams. This orchestration mechanism may also reside in a single device or split among multiple devices.

FIG. 1A illustrates an embodiment of a modular room system 100. In this example, a plurality of electronic components 101A-101K (collectively 101) are coupled by a local network 102. Examples of the local network 102 include Ethernet, Wi-Fi, Powerline, and/or Light Fidelity (Li-Fi). The components 101 are collectively configured to enable the network to facilitate a multimedia session with an external endpoint 150, (see FIG. 1B). The functions and controls of the multimedia session are shared amongst the plurality of electronic components 101. The components 101 may perform a variety of functions. For example, component 101A may include a composition module 110 performing composition functionality, component 101B may include a orchestration module 112 performing orchestration functionality. While the compositing module 110 and orchestration module 112 are shown on separate devices, in some embodiments, the modules may both be included on a single device or spread across multiple devices. Additionally, component 101E may include a user interface control as well as microphones and speakers, and components 101F, 101H, and 101I may include one or more cameras, microphones, and speakers. Components 101 may also include sensors and controllers, such as those fixed within a particular space, such as lighting controllers or location sensors.

Figure 1B:
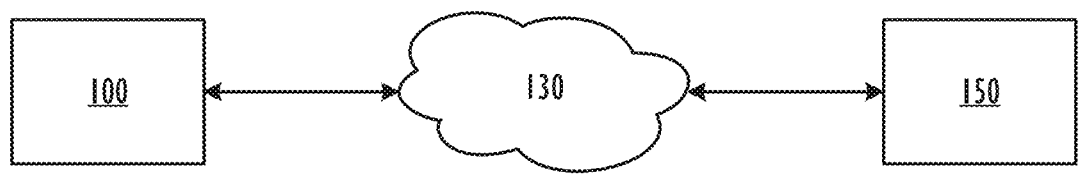
FIG. 1B illustrates a modular room system communicatively coupled to an external endpoint, in accordance with an embodiment of this disclosure.

FIG. 1B illustrates a modular room system 100 communicatively coupled to a remote endpoint 150 via a network 130. Examples of the network 130 include a local area network (LAN), a general wide area network (WAN), and/or a public network (e.g., the Internet). The remote endpoint 150 may be another modular room system 100 of any capability. Capabilities of the remote endpoint and the modular room system may be negotiated after a connection is established.

Modular Room Collaboration System

Traditional collaboration system endpoints relied on devices hardwired to each other in a set configuration topology. A modular room collaboration system may be a collaboration system endpoint comprising of one or more modular devices or systems interconnected to a network with no fixed topology and capable of dynamic configuration the topology and features based on the devices associated with the modular room.

Figure 2A:
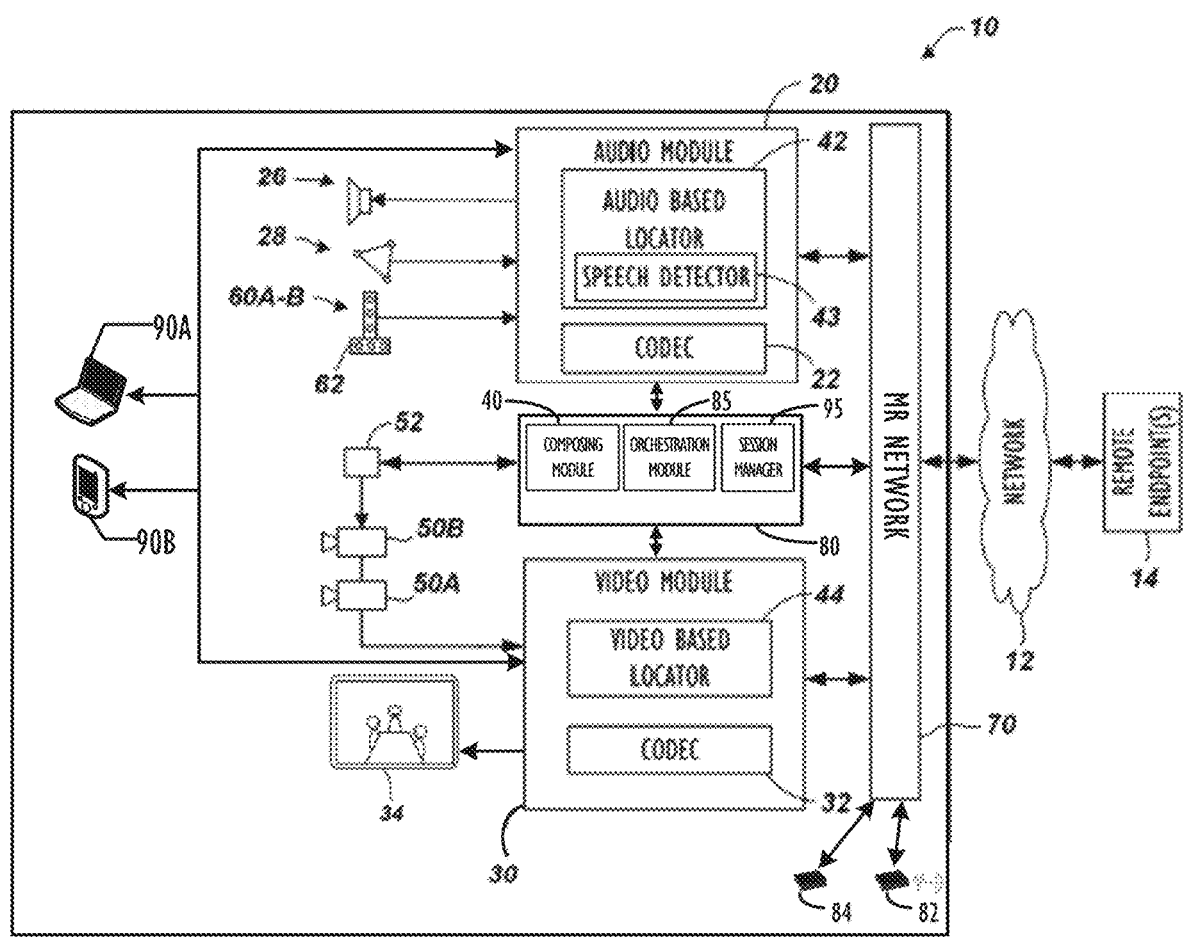
FIG. 2A illustrates a modular room collaboration system, according to aspects of the present disclosure.

FIG. 2A illustrates a modular room collaboration system, according to aspects of the present disclosure. Among some common components, the modular room 10 may have an audio module 20 with an audio codec 22 and a video module 30 with a video codec 32. The modular room includes modular room services 80 comprising of a composing module 40, an orchestration module 85, and a session manager 95. Importantly, while shown as a single construct, modular room services 80 are a logical construct describing a set of functionality for coordination and management of the modular room 10. As a logical construct, the modular room services 80 may be distributed across multiple devices at a module or sub-module level. For example, the composing module 40, orchestration module 85, and session manager 95 may all be hosted on separate devices, with the composing module 40 itself hosted on multiple devices and these devices connected together via MR network 70. The MR network 70, such as an internal LAN, generally connects the various devices and services available together into a modular room 10. Modules 20/30 may be coupled to the modular room services 80 and a network module 60. The modular room modular room 10 may communicate with one or more other collaboration systems, such as remote endpoints 14, over a network 12.

During a session, one or more cameras 50A-B capture video and provide the captured video to the video module 30 and codec 32 for processing. In certain cases, cameras 50A-B may incorporate encoding functionality and in those cases, a separate encoding by the codec 32 may not be needed. Additionally, one or more microphones 28 capture audio and provide the audio to the audio module 20 and codec 22 for processing. These microphones 28 can be table or ceiling microphones, or they can be part of a microphone pod or the like. The modular room 10 uses the audio captured with these microphones 28 primarily for the conference audio.

Separately, microphone arrays 60A-B having orthogonally arranged microphones 62 also capture audio and provide the audio to the audio module 22 for processing. The microphone arrays 60A-B may include both vertically and horizontally arranged microphones 62 for determining locations of audio sources during the session. Therefore, the modular room 10 uses the audio from these arrays 60A-B primarily for camera tracking purposes and not for conference audio, although their audio could be used for the conference.

After capturing audio and video, the captured audio and video are encoded using any of the common encoding standards, such as MPEG-1, MPEG-2, MPEG-4, H.261, H.263 and H.264. Then, the MR network 70 outputs the encoded audio and video to the remote endpoints 14 via the network 12 using any appropriate protocol. It may be noted that while shown separately, any module of the video module 30, including the video based locator 44 and codec 32 may be integrated into another component. For example, cameras 50A-B may both include a codec (not shown) and output separate streams of encoded video. A separate video module 30 may receive these separate video streams and re-encode the separate video streams together into a single output stream, or operate to select among the separate video streams and forward on one or more separate video streams to the remote endpoints 14. The video module 30 may operate select among the separate video streams based on input from a composing module 40, as well as requests from the remote endpoints 14.

In certain cases, the video module 30 may receive content streams. The content stream may include digital content to be presented, such as a digital presentation, and may include video, images, text, etc., and may be in a format of a markup language, such as HTML 5, or any other format. These content streams may, for example, be sent by the user devices 90A-B and may be included as a part of the video stream. In other cases, content may be handled by a separate content module.

User device 90A-B may be associated with the modular room 10 dynamically, such as on a session-by-session basis, and may expand the functionality and capabilities of the modular room 10. As a non-inclusive example, user devices 90A-B may include laptops, mobile devices, cameras, microphones, sensors, or other devices.

The MR network 70 receives conference audio and video via the network 12 from the remote endpoints 14 and sends these to their respective codec 22/32 for processing. Eventually, a loudspeaker 26 outputs conference audio, and a display 34 outputs conference video. It may be understood that while one display 34 is shown, multiple displays may be included in the modular room 10, each of which may display the same or different content. Likewise, the codec 22/32 may be disaggregate and handled by more than a single entity. For example, the codec may be disaggregate into a coder and decoder, where a camera performs the coding function and the decoding function may be handled by another entity. Many of these modules and other components can operate in a conventional manner well known in the art so that further details are not provided here.

The modular room 10 may use one or more room cameras 50A-B in an automated and coordinated manner to handle video and views of the collaboration system environment dynamically. A first camera 50A can be a fixed or room-view camera, and a second camera 50B can be a controlled or people-view camera. Using the room-view camera 50A, for example, the modular room 10 captures video of the room or at least a wide or zoomed-out view of the room that would typically include all the collaboration participants as well as some of the surroundings. Although described as fixed, the room-view camera 50A can actually be adjusted by panning, tilting, and zooming to control its view and frame the environment.

The modular room 10 may use the people-view camera 50B to capture video of one or more particular participants, such as one or more current speakers, in a tight or zoomed-in view. Therefore, the people-view camera 50B is particularly capable of panning, tilting, and zooming.

In one arrangement, the people-view camera 50B is a steerable Pan-Tilt-Zoom (PTZ) camera, while the room-view camera 50A is an Electronic Pan-Tilt-Zoom (EPTZ) camera. As such, the people-view camera 50B can be steered, while the room-view camera 50A can be operated electronically to alter its viewing orientation rather than being steerable. However, the modular room 10 can use other arrangements and types of cameras. In fact, both cameras 50A-B can be steerable PTZ cameras. Moreover, switching between wide and zoomed views can be shared and alternated between the two steerable cameras 50A-B so that one captures wide views when appropriate while the other captures zoomed-in views and vice-versa.

Additionally, the modular room 10 may include user devices 90A-B. User devices may include devices such as laptops, smartphones, smartwatches, etc. User devices 90A-B may include various devices capable of capturing audio or video, such as cameras, displays, and microphones, and outputting audio and video, such as speakers, headphones, and displays. The endpoint may use the audio and video capture devices and output devices of the user devices 90A-B in a manner similar to the other audio and video components.

In some implementation, the modular room 10 outputs only video from one of the multiple cameras at any specific time. As the collaboration proceeds, the output video from the modular room 10 can then switch between the various cameras from time to time. In general, the system 10 outputs the video from room-view camera 50A when there is no participant speaking (or operation has degraded), and the modular room 10 outputs the video from people-view camera 50B or user device cameras when one or more participants are speaking. In one benefit, switching between these camera views allows the far-end of a videoconference to appreciate the zoomed-in views of active speakers while still getting a wide view of the meeting room from time to time.

As an alternative, the modular room 10 can transmit video from multiple cameras simultaneously, and the modular room 10 can let the remote endpoint 76 decide which view to show, especially if the modular room 10 sends some instructions for selecting one or the other camera view. In yet another alternative, the modular room 10 can transmit video from multiple cameras simultaneously so one of the video images can be composited as a picture-in-picture of the other video image. For example, the people-view video from camera 50B can be composited with the room-view from camera 50A and user device cameras to be sent to the far end in a picture-in-picture (PIP) format.

To control the views captured by the two cameras 50A-B, the modular room 10 uses an audio based locator 42 and a video-based locator 44 to determine locations of participants and frame views of the environment and participants. Audio and/or video information from these locators 42/44 may be used to send camera commands to one or both of the cameras 50A-B to alter their orientations and the views they capture. For the people-view camera 50B, these camera commands can be implemented by an actuator or local control unit 52 having motors, servos, and the like that steer the camera 50B mechanically. For the room-view camera 50B, these camera commands can be implemented as electronic signals to be handled by the camera 50B.

To determine which camera 50A-B to use and how to configure its view, audio information may be obtained from the audio-based locator 42 and/or video information may be obtained from the video-based locator 44. For example, audio information may be processed by the audio based locator 42 from the horizontally and vertically arranged microphone arrays 24. The audio based locator 42 uses a speech detector 43 to detect speech in captured audio from the arrays 24 and then determines a location of a current speaker. Using the determined location, the people-view camera 50B may be steered toward that location. Video information processed by the video-based location 44 from the cameras 50A-B may be used to determine the locations of participants, to determine the framing for the views, and to steer the people-view camera 50B at the participants.

The wide view from the room-view camera 50A can give context to the people-view camera 50B and can be used so that participants at the far-end do not see video from the people-view camera 50B as it moves toward a participant. In addition, the wide view can be displayed at the far-end when multiple participants at the near-end are speaking or when the people-view camera 50B is moving to direct at multiple speakers. Transitions between the views from the multiple cameras can be faded and blended as desired to avoid sharp cut-a-ways when switching between camera views.

As the people-view camera 50B is moved toward the speaker, for example, the moving video from this camera 50B is preferably not transmitted to the far-end of the videoconference. Instead, the video from the room-view camera 50A is transmitted. Once the people-view camera 50B has properly framed the current speaker, however, the modular room 10 switches between the video from the cameras 50A-B.

All the same, the modular room 10 preferably does not simply switch automatically to capture views of speakers. Instead, camera changes are preferably timed. Too many camera switches over a period of time can be distracting to the conference participants. Accordingly, the modular room 10 preferably tracks those speakers using their locations, their voice characteristics, their frequency of speaking, and the like. Then, when one speaker begins speaking, the modular room 10 can quickly direct the people-view camera 50B at that frequent speaker, but the modular room 10 can avoid or delay jumping to another speaker who may only be responding with short answers or comments.

Although the modular room 10 preferably operates without user intervention, the modular room 10 may allow for user intervention and control. Therefore, camera commands from either one or both of the far and near ends can be used to control the cameras 50A-B. For example, the participants can determine the best wide view to be displayed when no one is speaking. Meanwhile, dynamic camera commands can control the people-view camera 50B as the videoconference proceeds. In this way, the view provided by the people-view camera 50B may be controlled automatically by the modular room 10.

The modular room 10 may also incorporate various sensors 82 or actuators 84. Sensors and actuators may provide room control, such as for controlling and adjusting lighting, screens, displays, temperature, etc. The sensors 82 and actuators 84 may be coupled via the MR network 70 to the other modules and services.

Figure 2B:
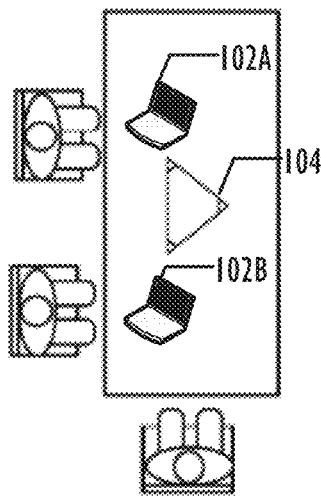
FIG. 2B illustrates a modular room collaboration system, according to aspects of the present disclosure.

FIG. 2B illustrates a simple modular room 100, according to aspects of the present disclosure. Modular room 10 may include one or more user devices 102A-B, and a speakerphone 104. The user devices 102A-B and speakerphone 104 may be wireless connected.

As discussed above, a collaboration system may include multiple fixed microphones, sensors, controllers, a central display device and central camera, as well as multiple user devices, such as laptops and smartphones, each equipped with separate microphones and cameras. These multiple individual multimedia streams may be coordinated into, for example, a single composed stream or set of selected streams for display. This coordination may be across a number of devices with distinct functionality that may be connected together over a local network rather than being directly physically connected or integrated. The user devices 102A-B may be moveable devices which may be associated with modular room 100 within the context of certain collaboration sessions, but otherwise are not dedicated for use with modular room 100.

The modular room services manage and coordinate the various devices to dynamically provide session functionality based on the specific configuration and capabilities of devices available for a session. Modular room services may be utilized to help take advantage of the capabilities offered by moveable devices that may be brought into a particular collaboration session. The modular room mechanism may offer flexibility as to how to utilize the varying capabilities offered by moveable devices by aggregating and distributing content for collaboration based on the capabilities of the moveable devices.

In order to ensure high quality audio, video and content, a real time network may be used to connect various elements of the present solution together within a physical room space. For example, an Ethernet based LAN, wired or wireless, supporting IEEE 1588 protocol for audio synchronization may be utilized, along with session initiation protocol (SIP), H.323, or another supported protocol. Devices may support multiple protocols and the exact protocol for a given session may be negotiated between devices. Multiple streams of audio, video and content/data can be received from the external network and can be sourced and sent from the local network.

Local collaboration solutions may include a multiplicity of hardware and/or software components that each have one or more specific functions. For example, there may be microphones, speakers, monitors, cameras, encoders, decoders, input devices, control devices, sensors, and other devices. These components may be physically connected to each other or connected wirelessly. In some embodiments these components are connected over a local area network (LAN). Components may also be connected through other components. For example, a camera may be physically connected through an encoder to other components such that communications for the camera are passed through the encoder to reach the camera.

Components connected by a LAN may discover and communicate with each other. Some components may act as proxies for other components, which may lack the connectivity functionality, such as an ordinary webcam, or connectivity to reach other components. Components may be configured into a specific topology or they may self-configure using discovery and an election algorithm, or by selecting and agreeing upon one of a set of predefined patterns that are available as part of their initial configuration or downloaded from an external source.

As an example of device discovery, components (both software and hardware) may be associated with a particular endpoint. Fixed components, such as a room camera, microphone, display, sensors, etc. may be associated with a particular endpoint as a part of an initial configuration of the endpoint. Additional components, such as user devices may be associated with the endpoint as needed, such as on a per collaboration session basis. For example, user devices may be devices not usually associated with a particular endpoint which are brought into the room for a particular collaboration session, such as computers, smartphones, sensors, or other moveable connected devices. Additionally, software elements associated with various devices, both fixed and moveable, may be associated with the endpoint as needed. This association may be performed, for example, via a UI component. Alternatively, location based or other methods may be used, for example via a specific Wi-Fi or Bluetooth connection, a location beacon or access point, direct wired connection, Quick Response (QR) code, bar code, etc.

Once associated with an endpoint, endpoint components may exchange capability information. An endpoint may be pre-configured with a particular set of fixed components to which additional components may be added. Where no additional components are added, then the endpoint may proceed as pre-configured. Where additional components are associated with the endpoint, the endpoint components may exchange capability information to assess how to integrate the additional components. This integration may be advantageous as it may afford a better video angle or clearer audio. As an example, a particular user device may include a camera, display, content for display, speakers, and a microphone, and the user device may indicate to one or more other components that the user device has these capabilities. Another user device may include a speaker, microphone, display, but a disabled camera. This other user device may indicate to one or more other components that the other user device has a speaker microphone, and display. The capabilities exchanged may include, for example, hardware components available, as well as software components available, as well as information related to those components, such as resolutions supported, encoding/decoding capabilities, processor speed and availability, bandwidth available, etc.

Based on the capabilities exchanged, functions for components may be determined. The functionality determination may be self-organized or directed by a particular component, such as the composing module. The determination may take into account what features are to be used for a particular collaboration session. For example, if a collaboration session is established without video, then components associated with video, such as displays, cameras, encoder/decoders, may not have a determined functionality or may have a determined functionality, but are not utilized. This functionality determination may take into account the functionality available across all associated components. The functionality determination may also take into account component capabilities. For example, where multiple cameras are available on a user device, the lower resolution one may be used for functionality determination as the lower resolution camera is associated with a user-facing rather than a rear facing camera, absent any indication otherwise. In some cases, certain components may be preferred, such as fixed components or components which are wired as opposed to wireless. These preferences may be defined, for example, as a set of parameters. The set of parameters may be remotely provided by a component of the endpoint, or may be stored by each component.

The Modular Room (MR) can produce and consume a multiplicity of different media streams including one or more audio streams, one or more video streams, or one or more content/data streams. These streams collectively form a session, such as a meeting, and may be managed by MR services, such as the session manager. The session manager generally handles call control functionality, such as defining what media streams go where and who is allowed to participate in the session. The session manager helps establish dynamic relationships between devices associated with the MR, as well as relationships between other MRs, endpoints, or other session participants in order to facilitate collaboration. The session manager roll may be performed by a designated (e.g., statically defined by template) device or set of devices, or dynamically assigned to a device or set of devices. In certain cases, the session manager functionality may be handled remotely, such as coordinated through cloud services.

According to certain aspects, templates may indicate various configuration information. In certain cases, templates may define certain functions for devices, such indication which devices or types of devices should perform a given function. For example, in certain cases, a template may indicate that a particular device, such as a codec, is to perform the composition function. Functions may also be dynamically determined. For example, a set of devices may query the available resources and functionality of the devices associated with the MR and vote on or assign a function to a particular device of the set of devices based on the available resources and functionality. In certain cases, a template may rank or indicate a preference for various devices and functionality. In some cases, functionality, such as composition or orchestration, may be split across multiple devices. In certain cases, multiple devices and functionality may be combined. For example, all functionality and devices may be combined into a single unit. Configuration templates for such an all-in-one device may be based on the expected use cases of the all-in-one device and relatively simple.

The sessions may be established using protocols such as SIP, H.323 or by proprietary protocols as agreed between the components. For example, a session manager may establish a connection with a remote endpoint via H.323, decode a video stream provided by a camera using a proprietary format, and encode one or more streams for transmission to the remote endpoint. In certain embodiments, there may be one session manager within the MR. In other embodiments, multiple session managers may be used. The session manager can be pre-defined, such as with a component assigned to be the session manager, or the components can independently agree on which component or set of components will act as session managers based on the functionality available to each component.

The MR may also include composing mechanism performed, for example, by one or more composition modules. A composing mechanism may be provided for a site, such as a room, to provide an aggregation and coordination functionality. The composing mechanism helps define a logical grouping of devices and services to serve a particular purpose by defining a set of relationships between a subset of devices and services and defining roles of the subset of devices and services. The composing mechanism also helps captures and manages structural elements of a collaboration session by coordinating the relationships between devices and software and between streams in/out and the devices in the room. Based on the use cases needed for a particular presentation, the composing mechanism maps the needs of the use case to the functionality offered by the components associated with the endpoint. In addition, the composing mechanism may help coordinate various media streams into a composite format to help order the output of the multiple devices into a coherent way. In certain cases, the composing mechanism may include one or more collections of configuration data that defines both relationships and behaviors of various components, both hardware and software, and to compose them into a composite format. This composing mechanism may reside in a single device, or elements of the composing mechanism may be integrated into multiple devices.

According to certain aspects, the composition module may determine how to combine the multiple media streams together and render them into a composite format and outputting a coherent stream for consumption by a receiver, such as another MR. The composition module may include logic for defining rules for how streams may be managed. For example, the composition module may coordinate reception and management of multiple content streams from multiple endpoint components by instructing the relevant components how to format and route a particular stream. A received content streams may be directed to and decoded, for example, by a codec and sent to a particular display. Each camera may provide a video stream, microphones may provide one or more audio streams, and user devices or the network may provide a content stream along with additional audio and video streams from microphones and cameras on the user device. The codec may take these streams and outputs one or more streams for output to another endpoint. For example, the composition module may coordinate with the codec to output an indication of the various video streams available along with the video streams available.

In some cases, the composition module may coordinate multiple streams such that the multiple streams are composited into a single output, such as by directing the multiple streams to the codec to combine the audio streams and display multiple video streams together in a single stream video matrix. For example, where a remote endpoint having a single low bandwidth display, the composition module may coordinate the output of a single encoded stream from the multiple video streams. In other cases, the composition module may determine the most interesting or relevant video streams, such as based on the location of a speaker, to display and output that video stream, along with a selected audio streams and content stream. In some cases, the composition module may receive requests for a particular stream, which the composition module may comply with. In some cases where the particular stream or composition module is restricted, the composition module may ignore or deny such requests. The composition module may reside in any component or as a distinct component. For example, the composition module may be a software component within a conferencing application package installed on a user device, or sent to a component if that component is selected to perform the functions of the composition module.

The composition module may also route incoming audio streams to individual speakers or instruct the mixing of one or more audio streams before then sending them to speakers. The composition module may also route locally sourced microphone streams to the external network for processing or to other parties. Similarly, the composition module may route incoming video and content/data streams to local displays, or compose one or more video and content/data streams into a composite image to be rendered on local displays.

The composition module may also synchronize audio and video and content/data output to ensure high quality user experience. Routing and composition are generally ruled based and may be changed dynamically. Such rules can be pre-defined, added, selected, or determined algorithmically. Rules may include, for example, that video streams may go to a single display, while content/data streams to another; group video streams based on which organization(s) to which collaboration session participants belong; placing red frames around video streams having active talkers; four incoming content/data streams may be displayed in a grid and output to a single 4K monitor; and/or time stamps corresponding to the time at the originating endpoint of a video stream may be added to each video stream before rendering.

According to certain embodiments, composing may be performed by one or more composition modules local to the MR for rendering. In other embodiments, certain composing functionality may be performed remotely. For example, results may be sent to a network to be consumed by other participants. This can reduce the amount of composition or transcoding required in the network. Composing may also be used to ensure that a desired layout is preserved from one endpoint to other endpoints. For example, a desired layout may be composed of several camera feeds into a single composite video image. In another example, a subset of the total number of video streams from an MR may be forwarded to coordinate what streams may be viewed at another endpoint.

In certain cases, for endpoints with fewer requested features for a meeting or fewer available functionality, a dedicated composing module may not be needed. For example, an endpoint having a single audio and single video stream may not require enough composing functionality to require designation of a composing module. Where there are sufficient functionality available and sufficient features requested for a collaboration session, a composing module may be required. Fixed components may also have pre-designated functionality. Where a composing module is available from a fixed component, that composing module may be used. Where there is no pre-designated composing module, one may be assigned. In certain cases, such as where an endpoint contains multiple audio/video/content streams from components and user devices, but no composing module, a composing module may be assigned to a component having sufficient bandwidth and processing resources to handle the composing role.

In certain cases, multiple determinations may be made. For example, a first functionality determination may be made for a user device having a camera. After this initial functionality determination, a composing module may be assigned. A locating procedure may then be performed to locate the camera components within a room, such as with a visual or infrared pattern displayed or projected by another component. Based on this locating procedure, a second functionality determination may be made to not use the camera on the user device as the camera was not adequately located. After functionality determination, the determined functionality of a particular component may be sent to the particular component via the network.

The MR may also include orchestration functionality, for example, by an orchestration module. Generally, while composing functionality handles overall topology of devices and streams for a session, orchestration addresses the behavior of the devices and streams. Orchestration functionality may provide a logical set of actions/sequencing of devices and services to serve a purpose. This set of actions help defines a flow of control for a subset of devices and services and allows for sequencing and coordinating output of media streams and local information in a meaningful way. The orchestration functionality may capture and manage behaviors such as an order and sequence of streams, timing of operations between multiple devices, and behavior of sensors and controls.

An orchestration mechanism may be provided for a MR to provide a behavior management functionality. The orchestration mechanism provides functionality that includes those handled by a dedicated MCU. The orchestration mechanism helps provide rules for managing one or more streams, such as audio, video, content, or sensor streams, including stream aggregation, disaggregation, and distribution. In certain cases, the orchestration mechanism may coordinate with a stream management component based on the rules. These rules may be configured, for example, based on templates and/or based on the capabilities of the devices associated with the endpoint for a particular collaboration session. The orchestration mechanism may coordinate the output of media streams and location information to help determine how best to represent the kind of information being produced by the collaboration system. For example, the orchestration mechanism may coordinate alternating video and content streams based on what is happening in a particular meeting by dynamically moving participant video to the foreground and content to the background as a presentation shifts toward a discussion. As another example, the orchestration mechanism may lay out content being presented onto different monitors in a room automatically as a presentation progresses, for example, detecting and keeping agenda content posted on a tertiary display while presenting a current slide on a primary display and a previous slide on a secondary display. In addition, the orchestration mechanism may also coordinate the order and sequence of various media and content streams, the timing between multiple devices, and the behavior of various sensors and controllers to help manage the workflow and coordinate how to represent the collaboration experience. In certain cases, the orchestration mechanism functionality may be handled remotely, such as coordinated through cloud services.

Further certain elements of the composing and/or orchestration functionality may be remote from the endpoint. For example, configuration data, such as templates for classes or behaviors of components, for the composing element may be stored in the cloud. These templates may be received by the endpoint on demand and used to coordinate with a component. These remote stored templates may allow for new room configurations and workloads, and may be used to dynamically update the endpoint to handle any new configurations or workflows needed.

An orchestration module may reside in any component as an adjunct. An orchestration module can also reside in a distinct component. Orchestration allows for determining how to best represent to the information output suit the purpose of the collaboration. For example, orchestration functionality may include a story telling experience where PowerPoint content, such as slides, charts, or images, are displayed across multiple monitors in a particular pattern, which may include laying the content out in a time sequence where the oldest content is always displayed on the display most physically distant from a particular point and the newest content is displayed on the closest monitor to the particular point. Other orchestration functionality may include the use of spatial positioning to convey information, for example, showing a North view on a front display and a South view on the rear display, with East and West to the sides; animations and images cycling within a display or across displays to convey specific meaning, for example to add drama or excitement to a presentation; coordinating video and content on the same display or distributing them across multiple displays based on specific patterns; assigning media to displays that are most appropriate for the format, frame rate, resolution, etc.; coordinating audio with video and or content based on location, type of speakers, desired spatial relationship, etc. Certain functionality collocated in a space may be coordinated with functions outside of the space. For instance, an orchestration module can be located in a Software as a Service cloud and provide information to the components in a room so the components may be able to orchestrate media. This allows a MR to become a virtual architecture that may be overlaid on top of physical elements in a given room, allowing for greater processing power to be applied and new options to be enabled over time without changing any of the devices in the space.

MR services may also include services for handling business logic. Business logic may include rules which are specific to an enterprise or customer that reflect how streams are managed. For example, a business logic rule may filter certain information from certain streams. Business logic may also apply to and influence composition and session management functions. MR services may also handle coordinating routing, aggregation, prioritization, filtering of sensor and actuator information.

A particular MR may include multiple components such as white boards, content sources, etc. In an embodiment, a subset of those component streams are transmitted over the network either independently, or organized together. Alternatively component streams can be pre-assembled based on user preferences, automated preferences, or both. This provides more flexibility and may enable a sender to select composition and bridge functionality. For example, a user may be able to keep important items together or force grouping, for example to improve clarity, intent or IP protection, such as by attaching a personal image to a content image to serve as a watermark.

Figure 3:
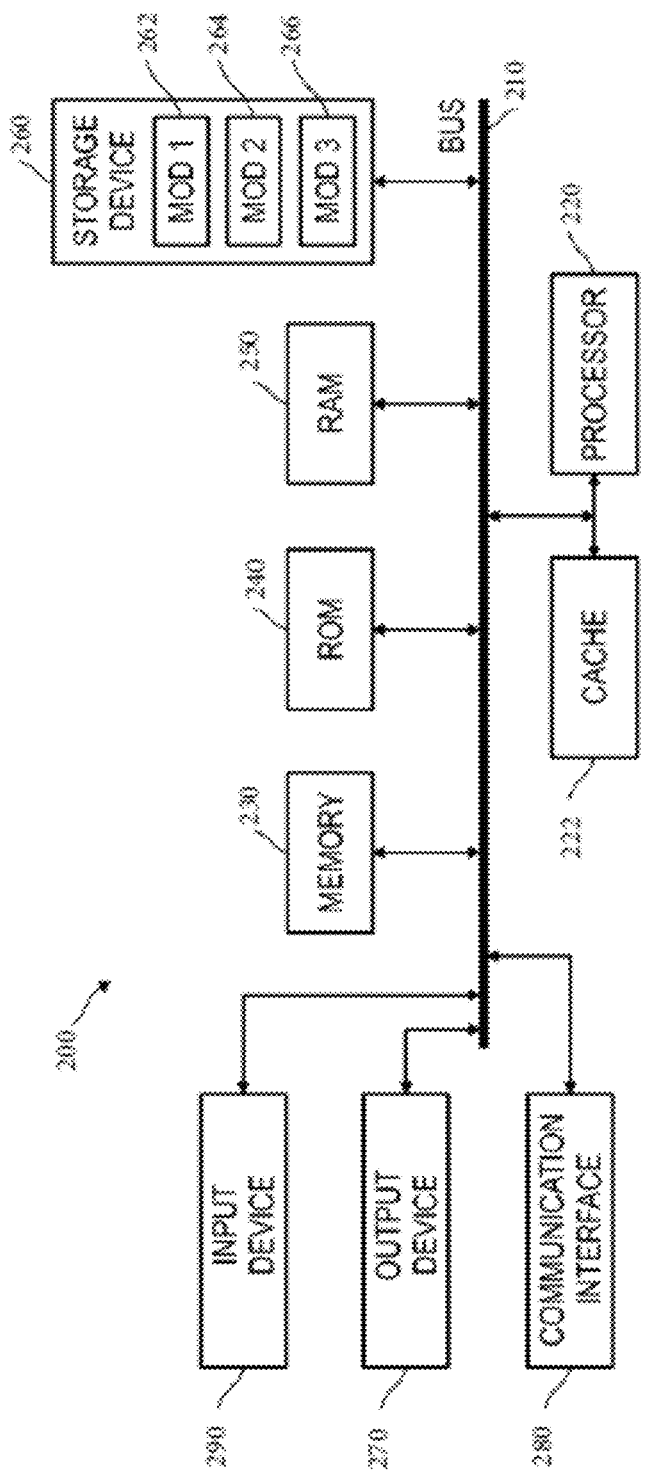
FIG. 3 illustrates an electronic component operable within a modular room system in accordance an embodiment disclosed herein.

FIG. 3 illustrates an example electronic component 200 which can be employed to practice the concepts and methods described above. The components disclosed herein can be incorporated in whole or in part into tablet computers, personal computers, handsets, transmitters, servers, and any other electronic or other computing device. As shown, computing device 200 can include a processing unit (CPU or processor) 220 and a system bus 210 that couples various system components including the system memory 230 such as read only memory (ROM) 240 and random access memory (RAM) 250 to the processor 220. The system 200 can include a cache 222 of high speed memory connected directly with, in close proximity to, or integrated as part of the processor 220. The system 200 copies data from the memory 230 and/or the storage device 260 to the cache 222 for quick access by the processor 220. In this way, the cache provides a performance boost that avoids processor 220 delays while waiting for data. These and other modules can control or be configured to control the processor 220 to perform various actions. Other system memory 230 may be available for use as well. The memory 230 can include multiple different types of memory with different performance characteristics. It can be appreciated that the disclosure may operate on a computing device 200 with more than one processor 220 or on a group or cluster of computing devices networked together to provide greater processing capability. The processor 220 can include any general purpose processor and a hardware module or software module, such as module 1 (262), module 2 (264), and module 3 (266) stored in storage device 260, configured to control the processor 220 as well as a special-purpose processor where software instructions are incorporated into the actual processor design. The processor 220 may essentially be a completely self-contained computing system, containing multiple cores or processors, a bus, memory controller, cache, etc. A multi-core processor may be symmetric or asymmetric.

The system bus 210 may be any of several types of bus structures including a memory bus or memory controller, a peripheral bus, and a local bus using any of a variety of bus architectures. A basic input/output system (BIOS) stored in ROM 240 or the like, may provide the basic routine that helps to transfer information between elements within the computing device 200, such as during start-up. The computing device 200 further includes storage devices 260 such as a hard disk drive, a magnetic disk drive, an optical disk drive, tape drive or the like. The storage device 260 can include software modules 262, 264, 266 for controlling the processor 220. Other hardware or software modules are contemplated. The storage device 260 is connected to the system bus 210 by a drive interface. The drives and the associated computer readable storage media provide nonvolatile storage of computer readable instructions, data structures, program modules and other data for the computing device 200. In one aspect, a hardware module that performs a particular function includes the software component stored in a non-transitory computer-readable medium in connection with the necessary hardware components, such as the processor 220, bus 210, output device 270, and so forth, to carry out the function.

Storage device 260 may comprise many types of computer readable media which can store data that are accessible by a computer, such as magnetic cassettes, flash memory cards, digital versatile disks, cartridges, random access memories (RAMs) 250, read only memory (ROM) 240, a cable or wireless signal containing a bit stream, a hard disk and the like, may also be used in the exemplary operating environment. Non-transitory computer-readable storage media expressly exclude media such as energy, carrier signals, electromagnetic waves, and signals per se.

To enable user interaction with the computing device 200, an input device 290 represents any number of input mechanisms, such as a microphone for speech, a touch-sensitive screen for gesture or graphical input, keyboard, mouse, motion input, speech and so forth. An output device 270 can comprise one or more of a number of output mechanisms. In some instances, multimodal systems enable a user to provide multiple types of input to communicate with the computing device 200. The communications interface 280 generally governs and manages the user input and system output. There is no restriction on operating on any particular hardware arrangement and therefore the basic features here may be substituted with improved hardware or firmware arrangements as they are developed.

For clarity of explanation, the embodiment of FIG. 3 is presented as including individual functional blocks including functional blocks labeled as a "processor" or processor 220. The functions these blocks represent may be provided through the use of either shared or dedicated hardware, including, but not limited to, hardware capable of executing software and hardware, such as a processor 220, that is purpose-built to operate as an equivalent to software executing on a general purpose processor. For example the functions of one or more processors presented in FIG. 2 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 240 for storing software performing the operations discussed below, and random access memory (RAM) 250 for storing results. Very large scale integration (VLSI) hardware embodiments, as well as custom VLSI circuitry in combination with a general purpose DSP circuit, may also be provided.

Figure 4:
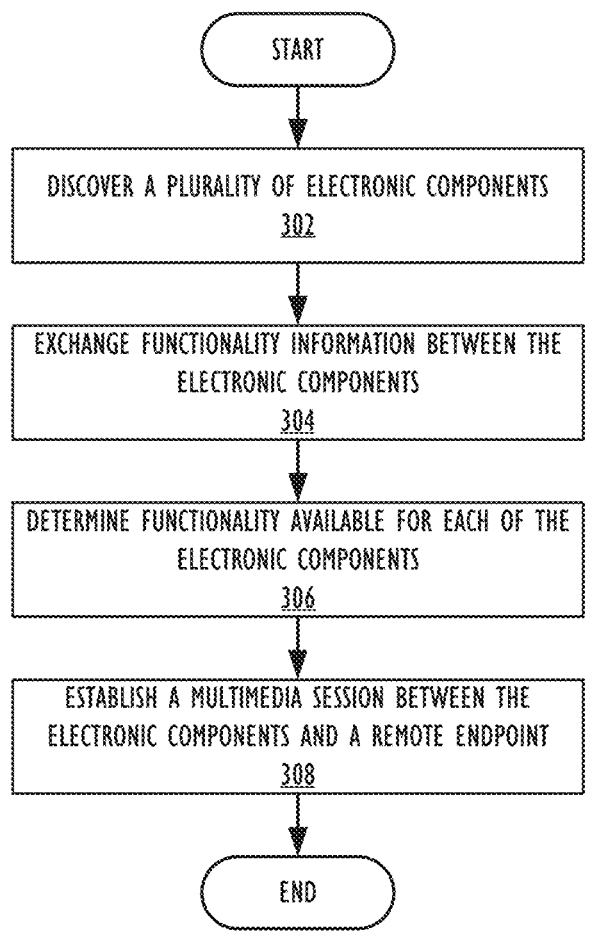
FIG. 4 is a flowchart illustrating a technique for disaggregate multipoint control, according to one embodiment.

FIG. 4 is a flowchart illustrating a technique for disaggregate multipoint control, according to one embodiment. At block 302, discovering a plurality of electronic components coupled together over a network. When additional components, such as user devices are to be used in conjunction with endpoint components, the additional components may be found during a discovering procedure, where the additional components are associated with the endpoint components. At block 304, exchanging functionality information between the plurality of electronic components. For example, components may exchange information related to hardware and software components available, as well as information related to those components, such as resolutions supported, encoding/decoding capabilities, processor speed and availability, bandwidth available, etc. This information may be exchanged as a part of, or in parallel with, the component discovery procedure. At block 306, determining functionality available for each of the plurality of electronic components based on the exchanged functionality information. The functionality determination may be self-organized by the various components or directed by a particular component, such as the composing module. Where a composing module is needed based on the available functionality offered by the components or requested functionality for a collaboration session, a component may be assigned to serve as the composing module. At block 308, establishing a multimedia session between the electronic components and a remote endpoint.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 200 shown in FIG. 2 can practice all or part of the recited methods, can be a part of the recited systems, and/or can operate according to instructions in the recited non-transitory computer-readable storage media. Such logical operations can be implemented as modules configured to control the processor 220 to perform particular functions according to the programming of the module.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Additional example embodiments include:

Example 1

A modular room system having disaggregate components, the modular room system comprising: a plurality of electronic components, the plurality of electronic components communicatively coupleable over a network and configured to, when coupled, enable the network to facilitate a multimedia session in which functions are sharable amongst two or more of the electronic components, wherein at least one of the sharable functions is a control function; and at least one of the electronic components is configured to: discover a first electronic component from amongst the plurality of electronic components; determine at least one functionality available to the first electronic component based, at least in part, on exchanged functionality information; assign a first function to the first electronic component; assign a second function to a second electronic component from amongst the plurality; and establish a multimedia session between the plurality of electronic components based on the assigned first and second functions.

Example 2

The modular room system of example 1, wherein audio control elements are controlled by a first electronic device and session control elements are controlled by a second electronic device.

Example 3

The modular room system of example 1, wherein the plurality of electronic components comprises multiple hardware components and multiple software components.

Example 4

The modular room system of example 3, wherein the plurality of electronic components comprises microphones, speakers, monitors, cameras, encoders, decoders, input devices, control devices, and sensors.

Example 5

The modular room system of example 3, wherein the plurality of electronic components are configured to automatically discover one another over the network.

Example 6

The modular room system of example 3, wherein each of the electronic components from amongst the plurality of electronic components is configured to integrate with one or more of the other electronic components from amongst the plurality in accordance with a predefined set of parameters based on capabilities of each of the electronic components.

Example 7

The modular room system of example 6, wherein each of the electronic components stores the predefined set of parameters.

Example 8

The modular room system of example 7, wherein at least some of the stored predefined set of parameters having been downloaded from an electronic component of the network.

Example 9

The modular room system of example 1, wherein the plurality of electronic components are configured to produce and consume a multiplicity of different media streams including one or more audio streams, one or more video streams, one or more content streams, one or more data streams, or a combination thereof.

Example 10

The modular room system of example 9, wherein at least one electronic component from amongst the plurality of electronic components is a session manager configured to manage the streams in coordination with one or more of a disaggregate multipoint control unit, one or more endpoints, and one or more network services that can participate in collaboration.

Example 11

The modular room system of example 10, wherein a determination as to which electronic component is the session manager is pre-defined.

Example 12

The modular room system of example 10, wherein a determination as to which electronic component is the session manager is determined by the plurality of electronic components based on capabilities of each electronic component amongst the plurality of electronic components.

Example 13

The modular room system of example 1, wherein the first function comprises a composition function for coordinating combination of multimedia streams into a composite format for use by the electronic components, determining how to distribute the multimedia streams amongst the electronic components, and how to render the multimedia streams by the electronic components.

Example 14

The modular room system of example 1, wherein the second function comprises an orchestration function for providing organization information, coordinating organization for multimedia streams, and distributing the multimedia streams amongst the electronic components.

Example 15

The modular room system of example 14, wherein the organization information is provided for use by the first function.

Example 16

The modular room system of example 14, wherein the organization information comprises information related to one of timing or ordering information for distributing the multimedia streams to a particular electronic component of the electronic components.

Example 17

The modular room system of example 1, wherein the network includes at least a portion of a local area network.

Example 18

The modular room system of example 17, wherein the local area network is configured to operate in conformity with the Institute of Electrical and Electronics Engineers 1588 audio synchronization protocol.

Example 18A

The modular room system of example 1, wherein the first and second electronic components comprise a common device.

Example 19

The modular room system of example 1, wherein two or more of the plurality of electronic components are physically wired to each other.

Example 20

A method for multimedia communications with disaggregate multipoint control, comprising: discovering a first electronic component from amongst a plurality of electronic components coupled over a network; determining functionality available to the first electronic component based, at least in part, exchanged functionality information; assigning a first function to the first electronic component; assigning a second function to a second electronic component from amongst the plurality; establishing a multimedia session between the electronic components based on the assigned first and second functions.

Example 21

The method of example 20, wherein audio control elements are controlled by a first electronic device of the plurality of electronic components and session control elements are controlled by a second electronic device of the plurality of electronic components.

Example 22

The method of example 20, wherein the plurality of electronic components comprises multiple hardware components and multiple software components.

Example 23

The method of example 22, wherein the plurality of electronic components comprises microphones, speakers, monitors, cameras, encoders, decoders, input devices, control devices, and sensors.

Example 24

The method of example 22, wherein each of electronic components are configured to automatically discover one another over the network.

Example 25

The method of example 24, wherein each of the electronic components of the plurality of electronic components is configured to integrate with the other electronic components according to a predefined set of parameters based on capabilities of each of the electronic components.

Example 26

The method of example 25, wherein each of the electronic components stores the predefined set of parameters.

Example 27

The method of example 25, wherein at least some of the predefined set of parameters having been downloaded from a component of the network.

Example 28

The method of example 20, wherein the plurality of electronic components are configured to produce and consume a multiplicity of different media streams including one or more audio streams, one or more video streams, one or more content streams, one or more data streams, or a combination thereof.

Example 29

The method of example 28, wherein at least one electronic component from amongst the plurality of electronic components is a session manager configured to manage the streams in coordination with one or more of a disaggregate multipoint control unit, one or more endpoints, or one or more network services that can participate in collaboration.

Example 30

The method of example 29, wherein a determination as to which electronic component is the session manager is predefined.

Example 31

The method of example 29, wherein a determination as to which electronic component is the session manager is determined by the plurality of electronic components based on capabilities of each of electronic component amongst the plurality of electronic components.

Example 32

The method of example 20, wherein the first function comprises a composition function for coordinating combination of media streams into a composite format for use by the electronic components, determining how to distribute multimedia streams amongst the electronic components, and how to render multimedia streams by the electronic components.

Example 33

The method of example 20, wherein the second function comprises an orchestration function for providing organizational information for multimedia streams and distributing the multimedia streams amongst the electronic components.

Example 34

The method of example 33, wherein the organization information is provided for use by the first function.

Example 35

The method of example 33, wherein the organization information comprises information related to one of timing or ordering information for distributing the multimedia streams to a particular electronic component of the electronic components.

Example 36

The method of example 20, wherein the network includes at least a portion of a local area network.

Example 37

The method of example 36, wherein the local area network is an Ethernet local area network configured to operate in conformity with the Institute of Electrical and Electronics Engineers 1588 audio synchronization protocol.

Example 38

The method of example 20, wherein the first and second electronic components comprise a common device.

Example 39

The method of example 20, wherein two or more of the plurality of electronic components are connected.

The various embodiments described above are provided by way of illustration only, and should not be construed so as to limit the scope of the disclosure. Various modifications and changes can be made to the principles and embodiments described herein without departing from the scope of the disclosure and without departing from the claims which follow.

The invention claimed is:

1. A modular room system having disaggregated components combined to form a local endpoint for a collaboration session, the local endpoint needing various functions to conduct the collaboration session, the various functions varying between collaboration sessions, the modular room system comprising:
   a plurality of electronic components, the plurality of electronic components communicatively couplable over a network and configured to, when coupled, enable the network to facilitate the collaboration session with a remote endpoint in which the various functions of the local endpoint are shared amongst two or more of the plurality of electronic components,
   wherein at least one of the functions that is shared is a control function, and
   wherein the plurality of electronic components comprise at least one or more of a microphone, a speaker, a monitor, a camera, or a sensor; and
   at least one of the plurality of electronic components is configured to automatically:
      discover the plurality of electronic components;
      obtain capability information from each of the plurality of electronic components;
      determine at least one functionality available to the each of the plurality of electronic components based, at least in part, on the capability information;
      assign individual functions of the various functions needed by the local endpoint for the collaboration session to one or more of the plurality of electronic components; and
      establish the collaboration session between the one or more of the plurality of electronic components and the remote endpoint by coordinating the individual functions to the one or more of the plurality of electronic components.

2. The modular room system of claim 1, wherein the various functions include audio functions and session functions, and
   wherein the audio functions are controlled by a first electronic component and the session functions are controlled by a second electronic component.

3. The modular room system of claim 1, wherein the plurality of electronic components further comprise one or more of encoders, decoders, input devices, or control devices.

4. The modular room system of claim 1, wherein the plurality of electronic components further comprise a video encoder and decoder and an audio encoder and decoder,
   wherein the collaboration session is without video, and
   wherein the at least one of the plurality of electronic components automatically assigns the individual functions to only the microphone, the speaker, and the audio encoder and decoder, and coordinates the microphone, the speaker, and the audio encoder and decoder to establish the collaboration session without video.

5. The modular room system of claim 1, wherein the each of the plurality of electronic components is configured to integrate with one or more other electronic components from amongst the plurality of electronic components in accordance with a predefined set of parameters based on capabilities of the each of the plurality of electronic components, and
   wherein the coordinating the individual functions to the one or more of the plurality of electronic components includes instructing at least two of the plurality of electronic components to operate the individual functions in accordance with the predefined set of parameters to provide at least one aspect of the collaboration session.

6. The modular room system of claim 5, wherein the each of the plurality of electronic components stores the predefined set of parameters.

7. The modular room system of claim 6, wherein at least one of the predefined set of parameters has been downloaded from an electronic component of the network.

8. The modular room system of claim 1, wherein the plurality of electronic components are configured to produce and consume a plurality of different media streams including one or more audio streams, one or more video streams, one or more content streams, one or more data streams, or a combination thereof.

9. The modular room system of claim 8, wherein one electronic component from amongst the plurality of electronic components is a session manager configured to automatically manage the plurality of different media streams in coordination with one or more of a disaggregated multipoint control unit, one or more remote endpoints, or one or more network services that can participate in collaboration.

10. A method of operating at least one electronic component to control collaboration communications using a plurality of electronic components combined to form a local endpoint for a collaboration session, the local endpoint needing various functions to conduct the collaboration session, the various functions varying between collaboration sessions, the method comprising:

discovering, automatically by the at least one control electronic component, the plurality of electronic components coupled over a network;

obtaining, automatically by the at least one electronic component, capability information from each of the plurality of electronic components;

determining, automatically by the at least one control electronic component, functionality available to the each of the plurality of electronic components based, at least in part, on the capability information;

assigning, automatically by the at least one control electronic component, individual functions of the various functions needed by the local endpoint for the collaboration session to one or more of the plurality of electronic components; and establishing the collaboration session between the one or more of the plurality of electronic components and a remote endpoint by coordinating, automatically by the at least one electronic component, the individual functions to the one or more of the plurality of electronic components.

11. The method of claim 10, wherein the various functions include audio functions and session functions, and
wherein the audio functions are controlled by a first electronic component of the plurality of electronic components such that the first electronic component is one of the at least one electronic component and the session functions are controlled by a second electronic component of the plurality of electronic components such that the second electronic component is one of the at least one electronic component.

12. The method of claim 10, wherein the plurality of electronic components comprise one or more of microphones, speakers, monitors, cameras, encoders, decoders, input devices, control devices, or sensors.

13. The method of claim 10, wherein the plurality of electronic components comprise a set of electronic components comprising a microphone, a speaker, a monitor, a camera, a video encoder and decoder, and an audio encoder and decoder,
wherein the collaboration session is without video, and
wherein the at least one of the plurality of electronic components automatically discovers the set of electronic components, automatically obtains the capability information of the set of electronic components, automatically determines at least one functionality of each of the set of electronic components, automatically assigns individual functions to only the microphone, the speaker, and the audio encoder and decoder of the set of electronic components, and coordinates the microphone, the speaker, and the audio encoder and decoder to establish the collaboration session without video.

14. The method of claim 13, wherein the each of the plurality of electronic components is configured to integrate with other electronic components of the plurality of electronic components according to a predefined set of parameters based on capabilities of the each of the plurality of electronic components, and
wherein coordinating the individual functions of the plurality of electronic components to establish the collaboration session includes instructing at least two of the plurality of electronic components to operate the individual functions in accordance with the predefined set of parameters to provide at least one aspect of the collaboration session.

15. The method of claim 14, wherein the each of the plurality of electronic components stores the predefined set of parameters.

16. The method of claim 14, wherein at least one of the predefined set of parameters has been downloaded from a component of the network.

17. The method of claim 10, wherein the plurality of electronic components are configured to produce and consume a plurality of different media streams including one or more audio streams, one or more video streams, one or more content streams, one or more data streams, or a combination thereof.

18. The method of claim 17, wherein at least one electronic component from amongst the plurality of electronic components is a session manager configured to automatically manage the plurality of different media streams in coordination with one or more of a disaggregated multipoint control unit, one or more remote endpoints, or one or more network services that can participate in collaboration.

* * * * *